US008022965B2

(12) United States Patent
Gibbs et al.

(10) Patent No.: US 8,022,965 B2
(45) Date of Patent: *Sep. 20, 2011

(54) SYSTEM AND METHOD FOR DATA ASSISTED CHROMA-KEYING

(75) Inventors: Simon Gibbs, San Jose, CA (US); Michael Hoch, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/439,304

(22) Filed: May 22, 2006

(65) Prior Publication Data

US 2006/0209088 A1 Sep. 21, 2006

Related U.S. Application Data

(63) Continuation of application No. 10/215,520, filed on Aug. 8, 2002, now Pat. No. 7,091,989.

(60) Provisional application No. 60/311,477, filed on Aug. 10, 2001.

(51) Int. Cl.
*G09G 5/00* (2006.01)

(52) U.S. Cl. ........ 345/619; 345/620; 345/625; 345/469; 345/589; 345/592; 345/601; 345/602; 348/169; 348/218.1; 348/333.04; 348/333.05

(58) Field of Classification Search .............. 345/619, 345/620, 625, 469, 616, 589, 592, 601, 602; 348/169, 218.1, 333.04
See application file for complete search history.

(56) References Cited

U.S. PATENT DOCUMENTS

| 4,202,008 | A | * | 5/1980 | King .......................... 348/587 |
| 4,716,458 | A | | 12/1987 | Heitzman et al. |
| 4,970,666 | A | | 11/1990 | Welsh et al. |
| 4,987,552 | A | | 1/1991 | Nakamura |
| 5,398,075 | A | * | 3/1995 | Freytag et al. ............. 348/590 |
| 5,457,370 | A | | 10/1995 | Edwards |
| 5,577,188 | A | | 11/1996 | Zhu |
| 5,600,368 | A | | 2/1997 | Matthews et al. |
| 5,610,653 | A | | 3/1997 | Abecassis |
| 5,673,401 | A | | 9/1997 | Volk et al. |
| 5,689,442 | A | | 11/1997 | Swanson et al. |
| 5,714,997 | A | | 2/1998 | Anderson |

(Continued)

FOREIGN PATENT DOCUMENTS

WO  WO 00/67867  11/2000

OTHER PUBLICATIONS

Rick Cavallaro, "The Fox Trax Hockey Puck Tracking System", Mar.-Apr. 1997, pp. 6-12, IEEE.

*Primary Examiner* — Matthew Bella
*Assistant Examiner* — Mike Rahmjoo
(74) *Attorney, Agent, or Firm* — Blakely, Sokoloff, Taylor & Zafman LLP

(57) ABSTRACT

The invention illustrates a system and method of displaying a base image and an overlay image comprising: capturing a base image of a real event; receiving an instrumentation data based on the real event; identifying a visual segment within the base image based on the instrumentation data; and rendering an overlay image within the visual segment.

17 Claims, 7 Drawing Sheets

U.S. PATENT DOCUMENTS

| | | | |
|---|---|---|---|
| 5,729,471 A | 3/1998 | Jain et al. | |
| 5,742,521 A | 4/1998 | Ellenby et al. | |
| 5,745,126 A | 4/1998 | Jain et al. | |
| 5,796,991 A | 8/1998 | Shimizu | |
| 5,823,786 A | 10/1998 | Easterbrook | |
| 5,838,310 A * | 11/1998 | Uya | 345/536 |
| 5,850,232 A * | 12/1998 | Engstrom et al. | 345/539 |
| 5,860,862 A | 1/1999 | Junkin | |
| 5,865,624 A | 2/1999 | Hayashigawa | |
| 5,878,174 A | 3/1999 | Stewart et al. | |
| 5,900,868 A | 5/1999 | Duhault et al. | |
| 5,953,076 A * | 9/1999 | Astle et al. | 348/584 |
| 5,966,132 A | 10/1999 | Kakizawa et al. | |
| 5,986,718 A * | 11/1999 | Barwacz et al. | 348/592 |
| 5,995,941 A | 11/1999 | Maquire et al. | |
| 6,002,982 A * | 12/1999 | Fry | 701/213 |
| 6,031,545 A * | 2/2000 | Ellenby et al. | 345/632 |
| 6,044,397 A | 3/2000 | Eleftheriadis et al. | |
| 6,061,056 A | 5/2000 | Menard et al. | |
| 6,067,653 A * | 5/2000 | Tsukagoshi | 714/746 |
| 6,072,504 A | 6/2000 | Segen | |
| 6,080,063 A | 6/2000 | Khosla | |
| 6,133,962 A | 10/2000 | Proehl et al. | |
| 6,144,375 A | 11/2000 | Jain et al. | |
| 6,147,716 A | 11/2000 | Ohki | |
| 6,148,280 A | 11/2000 | Kramer | |
| 6,151,009 A | 11/2000 | Kanade et al. | |
| 6,159,016 A | 12/2000 | Lubell et al. | |
| 6,178,007 B1 * | 1/2001 | Harrington | 358/1.9 |
| 6,193,610 B1 | 2/2001 | Junkin | |
| 6,219,011 B1 | 4/2001 | Aloni et al. | |
| 6,229,550 B1 | 5/2001 | Gloudemans et al. | |
| 6,236,395 B1 | 5/2001 | Sezan et al. | |
| 6,266,100 B1 | 7/2001 | Gloudemans et al. | |
| 6,282,317 B1 * | 8/2001 | Luo et al. | 382/203 |
| 6,295,115 B1 * | 9/2001 | Zhang et al. | 355/32 |
| 6,353,461 B1 | 3/2002 | Shore et al. | |
| 6,359,585 B1 | 3/2002 | Bechman et al. | |
| 6,366,316 B1 * | 4/2002 | Parulski et al. | 348/239 |
| 6,378,132 B1 | 4/2002 | Grandin et al. | |
| 6,384,871 B1 * | 5/2002 | Wilf et al. | 348/578 |
| 6,408,257 B1 * | 6/2002 | Harrington et al. | 702/150 |
| 6,414,696 B1 | 7/2002 | Ellenby et al. | |
| 6,445,815 B1 | 9/2002 | Sato | |
| 6,449,540 B1 | 9/2002 | Rayner | |
| 6,466,250 B1 | 10/2002 | Hein et al. | |
| 6,466,275 B1 | 10/2002 | Honey et al. | |
| 6,483,523 B1 | 11/2002 | Feng | |
| 6,525,780 B1 | 2/2003 | Bruno et al. | |
| 6,535,114 B1 | 3/2003 | Suzuki et al. | |
| 6,535,226 B1 | 3/2003 | Sorokin et al. | |
| 6,537,076 B2 | 3/2003 | McNitt et al. | |
| 6,545,705 B1 * | 4/2003 | Sigel et al. | 348/157 |
| 6,571,012 B1 * | 5/2003 | Pettigrew | 382/167 |
| 6,571,054 B1 * | 5/2003 | Tonomura et al. | 386/95 |
| 6,571,193 B1 | 5/2003 | Unum et al. | |
| 6,593,936 B1 | 7/2003 | Huang et al. | |
| 6,597,406 B2 | 7/2003 | Gloudemans et al. | |
| 6,642,939 B1 | 11/2003 | Vallone et al. | |
| 6,674,461 B1 | 1/2004 | Klapman | |
| 6,681,395 B1 | 1/2004 | Nishi | |
| 6,697,072 B2 * | 2/2004 | Russell et al. | 345/474 |
| 6,707,456 B1 | 3/2004 | Marrin et al. | |
| 6,710,822 B1 | 3/2004 | Walker et al. | |
| 6,720,990 B1 | 4/2004 | Walker et al. | |
| 6,741,241 B1 | 5/2004 | Jaubert et al. | |
| 6,750,919 B1 | 6/2004 | Rosser | |
| 6,760,916 B2 | 7/2004 | Holtz et al. | |
| 6,771,272 B2 | 8/2004 | Deering | |
| 6,778,085 B2 | 8/2004 | Faulkner et al. | |
| 6,791,574 B2 | 9/2004 | Hoch et al. | |
| 6,792,321 B2 | 9/2004 | Sepe, Jr. | |
| 6,810,341 B2 | 10/2004 | Qian et al. | |
| 6,825,875 B1 | 11/2004 | Strub et al. | |
| 6,330,486 B1 | 12/2004 | Padula | |
| 6,850,250 B2 | 2/2005 | Hoch et al. | |
| 6,860,806 B2 | 3/2005 | Kojima et al. | |
| 6,868,440 B1 | 3/2005 | Gupta et al. | |
| 6,882,793 B1 | 4/2005 | Fu et al. | |
| 6,987,535 B1 * | 1/2006 | Matsugu et al. | 348/239 |
| 7,016,540 B1 * | 3/2006 | Gong et al. | 382/225 |
| 7,065,250 B1 | 6/2006 | Lennon | |
| 7,120,586 B2 | 10/2006 | Loui et al. | |
| 7,313,808 B1 | 12/2007 | Gupta et al. | |
| 7,369,130 B2 | 5/2008 | Kawabe et al. | |
| 2001/0003715 A1 | 6/2001 | Jutzi et al. | |
| 2001/0005218 A1 | 6/2001 | Gloudemans et al. | |
| 2001/0012324 A1 * | 8/2001 | Normile | 375/240.05 |
| 2001/0014175 A1 * | 8/2001 | Tavor | 382/167 |
| 2001/0023202 A1 | 9/2001 | Okubo | |
| 2002/0010928 A1 | 1/2002 | Sahota | |
| 2002/0016971 A1 | 2/2002 | Berezowski et al. | |
| 2002/0024450 A1 | 2/2002 | Townsend et al. | |
| 2002/0027617 A1 * | 3/2002 | Jeffers et al. | 348/587 |
| 2002/0064764 A1 * | 5/2002 | Fishman et al. | 434/252 |
| 2002/0069265 A1 | 6/2002 | Bountour et al. | |
| 2002/0152462 A1 | 10/2002 | Hoch et al. | |
| 2002/0170068 A1 | 11/2002 | Rafey et al. | |
| 2002/0178450 A1 | 11/2002 | Morita et al. | |
| 2002/0188943 A1 | 12/2002 | Freeman et al. | |
| 2003/0033318 A1 | 2/2003 | Carlbom et al. | |
| 2003/0038892 A1 | 2/2003 | Wang et al. | |
| 2003/0169335 A1 | 9/2003 | Monroe | |
| 2004/0107439 A1 | 6/2004 | Hassell | |
| 2004/0170321 A1 | 9/2004 | Gong et al. | |
| 2005/0028194 A1 | 2/2005 | Elenbaas et al. | |

* cited by examiner

SYSTEM AND METHOD FOR DATA ASSISTED CHROMA-KEYING

CROSS REFERENCE TO RELATED APPLICATIONS

The present patent application is a Continuation of application Ser. No. 10/215,520, filed Aug. 8, 2002 now U.S. Pat. No. 7,091,989, entitled "A System and Method for Data Assisted Chroma-Keying", which claims benefit of U.S. provisional application entitled "Method and Apparatus for Mixed Reality Broadcast" filed on Aug. 10, 2001, with Ser. No. 60/311,477.

FIELD OF THE INVENTION

The invention relates generally to audio/visual content and more particularly to an apparatus and method for improved chroma-keying using instrumentation data.

BACKGROUND OF THE INVENTION

Typical television sport event coverage includes many video cameras covering different parts of the event. Some televised football games have as many as 20 video cameras covering the football field and are capable of providing a viewpoint from many different directions.

In many televised events, it is desirable to include overlays in portions of the televised broadcast. These overlays may include graphical or captured images such as scoreboards, games statistics, advertisements, logos, and play-by-play graphics. To produce a television program of a live event with overlays such as a football game, a large amount of manual input is typically required to create a television program displaying scenes of the football game in conjunction with the overlays placed in an appropriate position. For the overlays to be effective, they should not block an important portion of the live programming. However, positioning the overlays is typically a manually intensive operation.

SUMMARY OF THE INVENTION

The invention illustrates a system and method of displaying a base image and an overlay image comprising: capturing a base image of a real event; receiving an instrumentation data based on the real event; identifying a visual segment within the base image based on the instrumentation data; and rendering an overlay image within the visual segment.

Other aspects and advantages of the invention will become apparent from the following detailed description, taken in conjunction with the accompanying drawings, illustrated by way of example of the principles of the invention.

DETAILED DESCRIPTION

Specific reference is made in detail to the embodiments of the invention, examples of which are illustrated in the accompanying drawings. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

The invention includes a system and method for employing an improved chroma-keying system that utilizes instrumentation data. The invention utilizes techniques for seamlessly displaying an overlay image within a base image in response to the instrumentation data gathered by video cameras and/or sensors. For the sake of simplicity and clarity, the invention is described with MPEG-2 being chosen as the delivery mechanism. However, any delivery mechanism suitable for use with the invention may be utilized.

Figure 1:
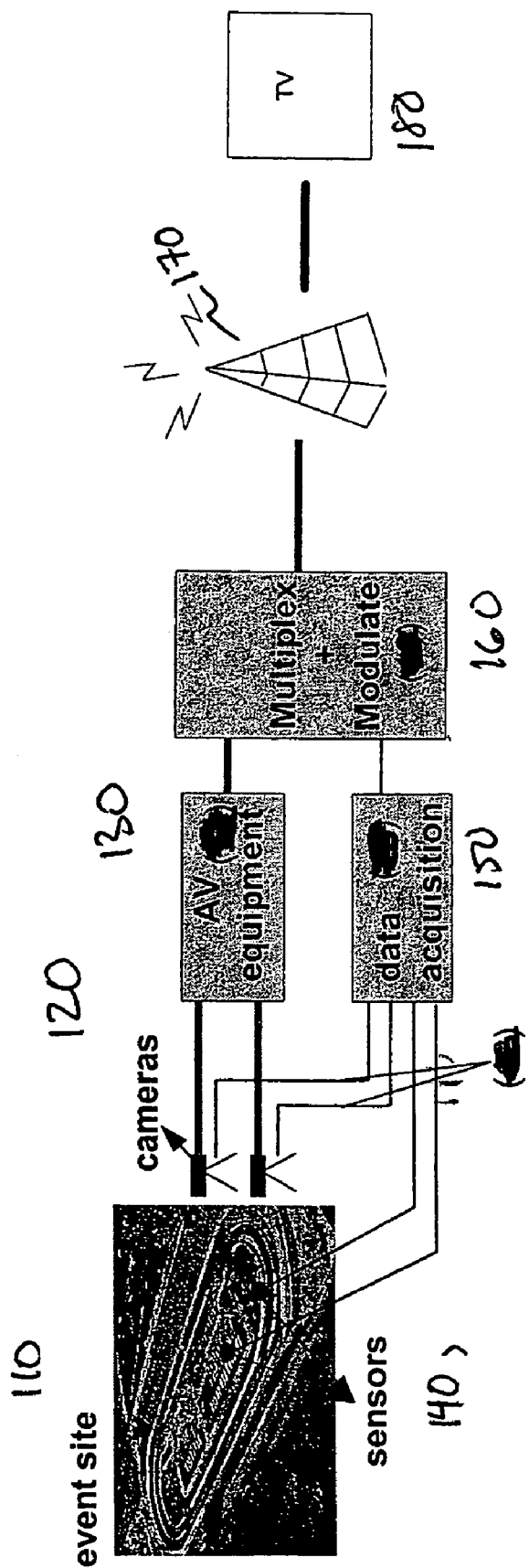
FIG. 1 illustrates one embodiment of a system overview according to the invention.

FIG. 1 illustrates a schematic diagram of one embodiment of a data acquisition and transmission system for use with a digital television system. In this illustrated example, an event occurs at an event site 110. In one embodiment, the event at the event site 110 is a televised football game. However, any live event such as a sports event, a concert, a theatrical event, and the like may be utilized.

A plurality of cameras 120 is utilized to capture visual and audio signals of the event at the event site 110. In addition, the plurality of cameras 120 also captures camera instrumentation data concurrently with the visual and audio signals. Camera instrumentation data may include, for each video frame, the camera location, tilt, zoom, pan, field of view, focus setting, iris setting, and other information related to the optics of each of the plurality of cameras 120.

A plurality of sensors 140 are utilized within the event site 110 to capture performance instrumentation data. The performance instrumentation data describes the real event at the event site 110. The plurality of sensors 140 may capture the performance instrumentation data concurrently with the data camera instrumentation data captured by the plurality of cameras 120. In this example of a televised football game, each football player may utilize a global positioning satellite unit in their helmet as one of the plurality of sensors 140 to provide the performance instrumentation data in the form of the position related to the football player. In another embodiment, one of the plurality of sensors 140 may include force sensor within each helmet to provide the performance instrumentation data in the form of the force exerted on the football player. These specific examples of the plurality of sensors 140 are shown for exemplary purposes only. Any type of sensor used to measure a physical aspect of the event at the event site 110 may be utilized.

An audio/visual equipment module 130 is configured to process the audio visual signals. In one embodiment, the audio/visual equipment module 130 is configured to receive the audio/visual signals from the plurality of cameras 120.

A data acquisition module 150 is configured to process instrumentation data. In one embodiment, the data acquisition module 150 is configured to receive the camera instrumentation data from the plurality of cameras 120 and the performance instrumentation data from the plurality of sensors 140. Thus, the performance data collected in the data acquisition module 150 includes both the camera instrumentation data which relates to particular parameters associated with the plurality of cameras 120 while recording the event and the performance instrumentation data which relates to data captured by the plurality of sensors 140 which describes aspects of the event.

The multiplex and modulate module 160 is configured to receive the audio visual signals from the audio visual equipment module 130 and the instrumentation data from the data acquisition module 150. In one embodiment, the module 160 is configured to multiplex and modulate the audio visual signals with the instrumentation data into a unified signal relative to time. A transmitter module 170 is configured to receive the unified signal from the multiplex and modulate module 160 and to transmit this unified signal. A television 180 a shown as an exemplary device to receive the unified signal via the transmitter module 170.

Figure 2:
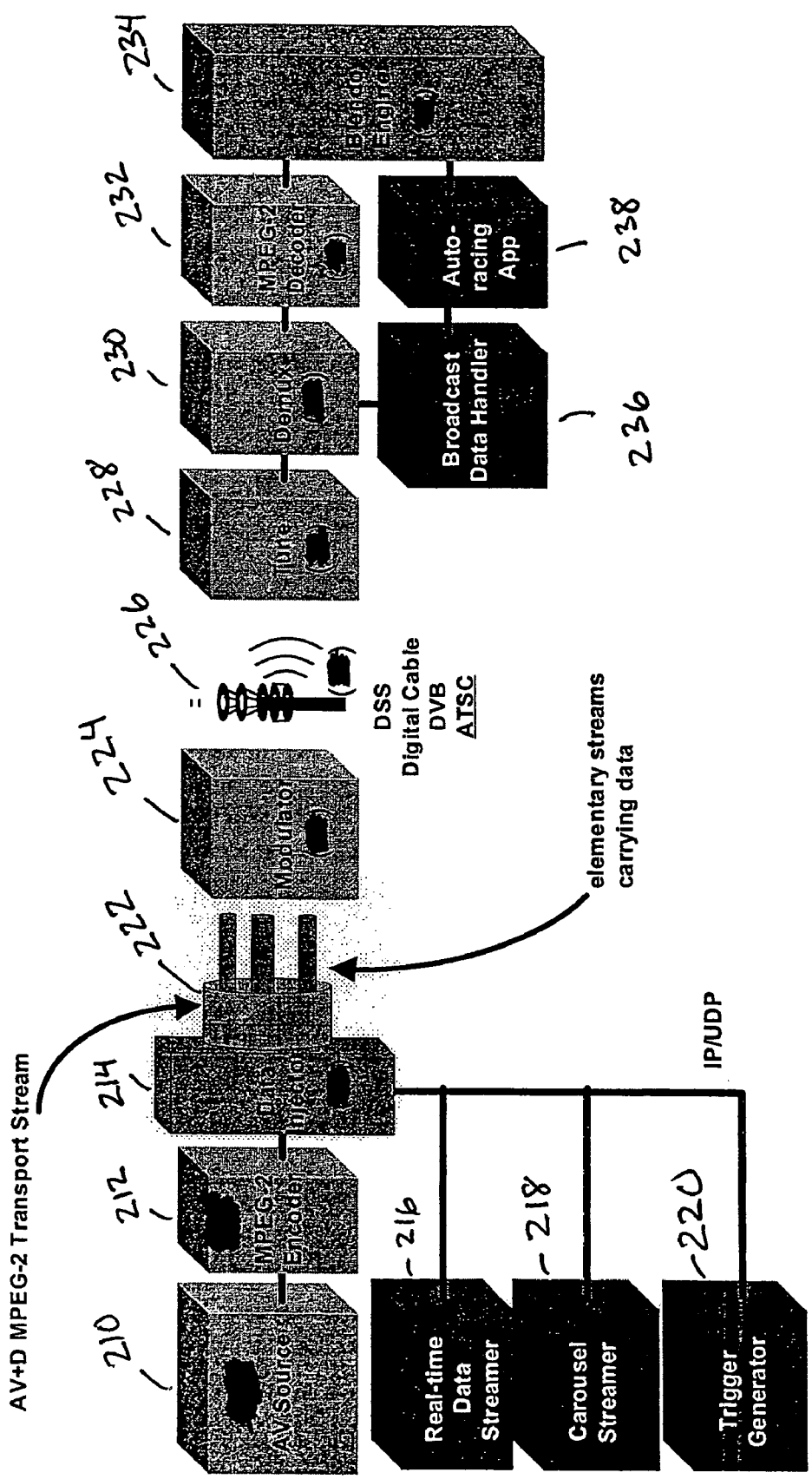
FIG. 2 illustrates one embodiment of a system overview according to the invention.

With reference to FIG. 2, a system 200 is shown for acquiring and processing both audio and video signals of an event and corresponding instrumentation data which describes physical parameters of the event according to one embodiment of the invention. In one example within the context of auto racing, the instrumentation data may include car speed, engine performance, physical location of the car, forces applied to the car, and the like. In other embodiments, the instrumentation data will vary with the specific application of the invention.

The instrumentation data corresponds with the audio and video signals in real time; the instrumentation data and the audio and video signals are temporally correlated. In one embodiment, they are temporally correlated by the use of timestamps. In another embodiment, they may be temporally correlated by relative signal timing.

In one embodiment, the system 200 includes an audio/visual (NV) source 210, an MPEG-2 encoder 212, a data injector 214, a real-time data streamer 216, a carousel streamer 218, a trigger generator 220, an A/V and data transport stream 222, a modulator 224, a transmitter 226, a tuner 228, a demultiplexer 230, an MPEG-2 decoder 232, a presentation engine 234, a broadcast data handler 236, and an application module 238. Additional specific elements common in computer system such as processors, memory, user interfaces, system busses, storage devices, and the like are not shown to prevent unnecessarily obscuring the aspects of the invention.

The components 210-238 are merely illustrated in FIG. 2 as one embodiment of the system 200. Although the components 210-238 are illustrated in FIG. 2 as separate components of the system 200, two or more of these components may be integrated, thus decreasing the number of components in the system 200. Similarly, the components 210-238 may also be separated, thus increasing the number of components within the system 200. Further, the components 210-238 may be implemented in any combination of hardware, firmware and software.

The A/V source 210 is connected to the MPEG-2 encoder 212 and provides the MPEG-2 encoder with NV content. In one embodiment, the A/V source 210 includes a video camera. However, in another embodiment, the A/V source 210 may also include a video cassette recorder, a digital recorder, or other means for providing A/V content. The MPEG-2 encoder 212 receives the A/V content and encodes this content to form an encoded A/V data stream according the MPEG-2 standard which is well known in the art. In other embodiments, other A/V encoders such as MPEG-1 or MPEG-4 may be utilized.

The MPEG-2 encoder 212, the real-time data streamer 216, the carousel streamer 218 and the trigger generator 220 are connected to the data injector 214. The real-time data streamer 216 provides the data injector 214 with instrumentation data which describes and corresponds in real-time with the A/V content from the A/V source 110. Instrumentation data describes in real-time physical aspects or conditions that correspond with the A/V content.

The carousel streamer 218 provides the data injector 214 with assets (e.g., images, audio clips, text files) related to the user interface. The trigger generator 220 provides the data injector 214 with data used to activated predefined actions on the receiver (e.g., authored questions for a trivia game or poll, advertisement names for pop-up ad inserts).

The data injector 214 receives incoming data from the MPEG-2 encoder 212, the real-time data streamer 216, the carousel streamer 218, and the trigger generator 220. The data injector 214 synchronizes the incoming data such that the data from the real-time data streamer 216, carousel streamer 218, and trigger generator 220 are timed with the corresponding encoded A/V data stream. The data injector 214 is connected to the A/V and data transport stream 222 and feeds the synchronized data through the NV and data transport stream 222 to the modulator 224.

The modulator 224 receives the synchronized data. The synchronized data includes the encoded A/V data stream and associated instrumentation data from the real-time data streamer 216, carousel streamer 218, and trigger generator 220. The modulator 224 broadcasts this synchronized data through the transmitter 226. The transmitter 226 may broadcast through air, cable, phone lines, and the like.

The tuner 228 receives the synchronized data which is broadcast through the transmitter 226. The demultiplexer 230 is connected to the tuner 228 and receives the synchronized data from the tuner 228. The demultiplexer 230 separates the encoded A/V data stream from other data originally from the real-time data streamer 216, carousel streamer 218, and trigger generator 220. The MPEG-2 decoder 232 is connected to the demultiplexer 230 and receives the encoded A/V data stream from the demultiplexer 230. The broadcast data handler 236 is connected to the demultiplexer. The data from the real-time data streamer 216, carousel streamer 218, and trigger generator 220, is received by the broadcast data handler 236 from the demultiplexer 230.

The MPEG-2 decoder processes the encoded A/V data stream and returns a decoded A/V data stream which is either identical or nearly identical to the original A/V data stream from the A/V source 210. Similar to the MPEG-2 encoder 212, the MPEG-2 decoder 232 may be substituted with other A/V encoders such as MPEG-1 or MPEG-4. The MPEG-2 decoder 232 is connected with the presentation engine 234. The presentation engine 234 receives the decoded A/V data stream from the MPEG-2 decoder 232.

The broadcast data handler 236 is connected to the application module 138. The broadcast data handler 236 reformats the data from the transport stream into data that the application module 238 can utilize. The data from the real-time data streamer 216, carousel streamer 218, and trigger generator 220 is received by the application module 238. The application module 238 utilizes the data from the real-time data streamer 216, carousel streamer 218, and trigger generator 220. The application module 238 also interacts with the presentation engine 234.

Figure 3:
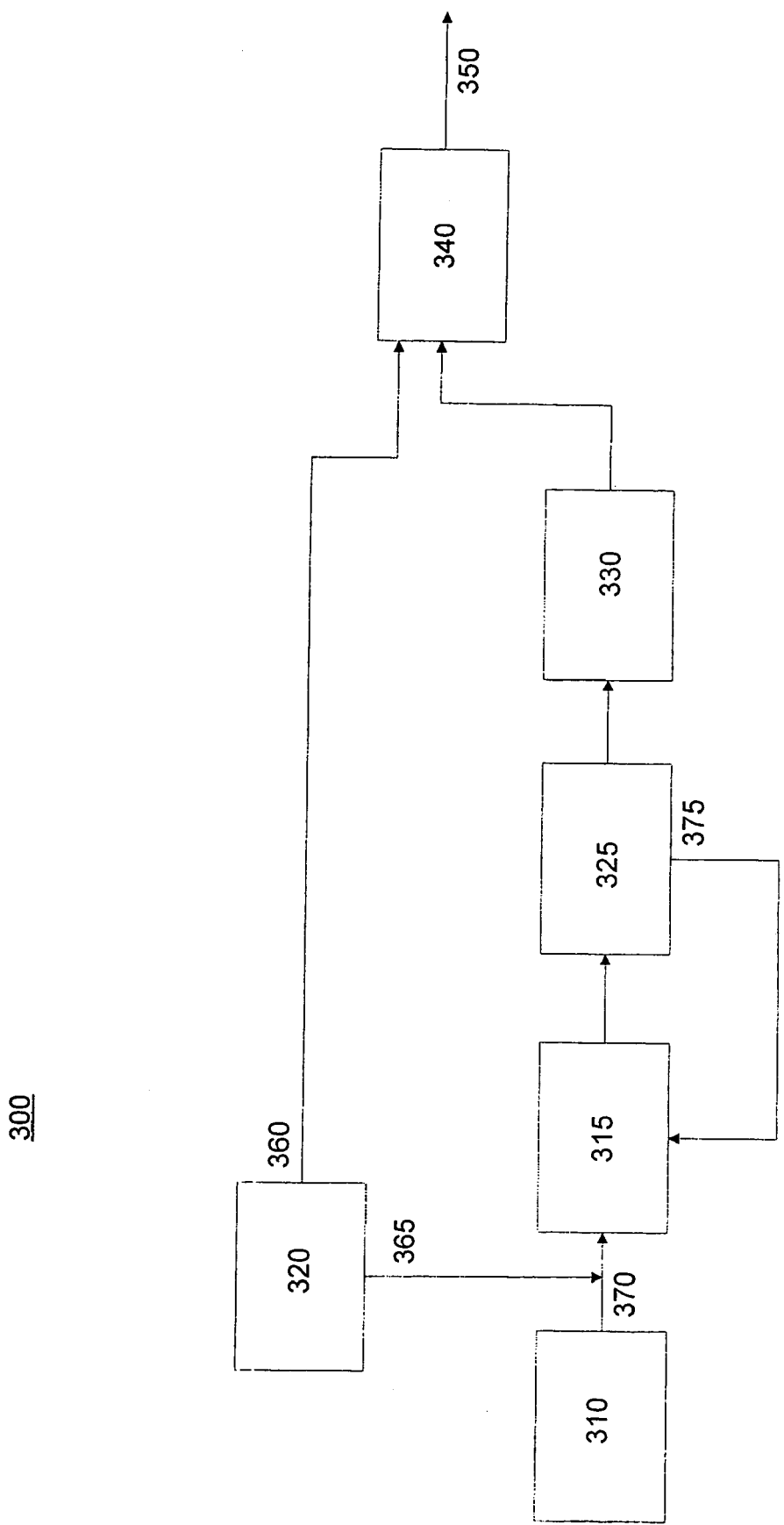
FIG. 3 illustrates an exemplary block diagram of the chroma-keying system according to the invention.

With reference to FIG. 3, a system 300 is shown for acquiring and processing both audio and video signals of an event and corresponding instrumentation data which describes physical parameters of the event and camera-parameters according to one embodiment of the invention. The system 300 includes a sensor 310, a segment identifier module 315, a camera 320, a color histogram module 325, a rendering module 330, and a compositing module 340.

The components 310-340 are merely illustrated in FIG. 3 as one embodiment of the system 300. Although the components 310-340 are illustrated in FIG. 3 as separate components of the system 300, two or more of these components may be integrated, thus decreasing the number of components in the system 300. Similarly, the components 310-340 may also be separated, thus increasing the number of components within the system 300. Further, the components 310-340 may be implemented in any combination of hardware, firmware and software.

In one embodiment, the sensor 310 and the camera 320 are configured on the broadcast side and the rendering module 330 and the compositing module 340 are configured to be placed on the receiver side. However, in other embodiments, the rendering module 330 and the compositing module 340 are configured to be placed on the broadcast side.

In one embodiment, the camera 320 is configured to capture both image data 360 and camera instrumentation data 365. The image data 360 is sent the compositing module 340. The camera instrumentation data 365 is sent to the rendering module 330. The camera instrumentation data 365 may include field-of-view data, camera position data, zoom data, and pan data of the event being captured by the camera 320. There may also be multiple cameras within the system 300 wherein each camera is uniquely identified.

The sensor 310 is configured to capture performance instrumentation data 370 for use by the rendering module 330. In one embodiment, an auto racing event is utilized to demonstrate various performance instrumentation data 370 within the system 300. In other embodiments, the system 300 may be applied to other events. For example, the performance instrumentation data 370 may include car speed, car engine performance parameters, forces exerted onto the car, car position, and the like. Multiple sensors may be utilized within the system 300.

The segment identifier module 315 receives the camera instrumentation data 365 and the performance instrumentation data 370. The segment identifier module 315 is configured to identify a visual segment through the use of camera instrumentation data and performance instrumentation data. The visual segment refers to a part of the base image which is captured by the camera 320. In one embodiment, the visual segment is the portion of the base image which gets superimposed or keyed in. In other words, the visual segment identifies the pixels which will be affected by the graphics insertion. Specific examples of graphics insertions are shown in the following figures.

The visual segment can be identified by coordinates in the base image which can be obtained from the camera instrumentation data and the performance instrumentation data. In one embodiment, a three-dimensional model of the base image is utilized in conjunction with the dimensions and coordinates of a surface used to display to correlate the camera instrumentation data with the size and coordinates to insert the graphic.

In another embodiment, the camera instrumentation data is utilized to identify the corner points or contours of the area bounding the visual segment in two dimensional space. In doing so, additional signals may be identified within the area bounding the visual segment. In another embodiment, the insertion surface may be more complex than a simple two dimensional surface. In this case, a more complete three dimensional model may be utilized to accurately define the corresponding visual segment.

The camera instrumentation data allows the definition of the boundaries of the visual segment where the projections of graphics occurs. In the case of a visual segment defined by a moving surface, such as a helmet of a football player, performance instrumentation data tracking the moving helmet and camera instrumentation data tracking the moving helmet relative to the viewpoint perspective are utilized. In this specific example, the visual segment moves with the corresponding football player.

Further, even in a specific example of a stationary object being the visual segment, such as the football field, the change in focus or zoom of the camera may change the coordinates of the visual segment. The coordinates of the visual segment may be constantly updated and recalculated based on the instrumentation data.

The color histogram module 325 is configured to identify the range of colors within the visual segment. The color histogram module 325 is also configured to calculate the amount and frequency of the colors contained within the visual segment. In one embodiment, the color histogram module 325 utilizes a specialized graph or plot to represent the number of colors and the amount and frequency of these colors within the visual segment.

In one embodiment, the color histogram module 325 also identifies a new key color value 375 and transmits this value 375 to the segment identifier module 315. In one embodiment, the new key color value 375 is chosen based on the nearest peak or nearest summit on the graph representing the various colors within the visual segment. In another embodiment, the new key color value 375 is related to color distribution where parameters such as sensitivity determine how closely the colors must match the key color to be considered part of the color key.

In another embodiment, various alternate systems besides the color histogram module 325 may be utilized to identify the key color value. For example, a variety of statistical algorithms and system may be utilized to identify the key color value.

In one embodiment, the rendering module 330 receives the instrumentation data, the key color value, and the visual segment information. In one embodiment, the rendering module 330 generates an overlay image based on the visual segment information. In another embodiment, the rendering module 330 generates an overlay image based on the key color value. In yet another embodiment, the rendering module 330 generates an overlay image based on the instrumentation data.

In one embodiment, the rendering module 330 is configured to generate an overlay image that incorporates the insertion of graphics to be displayed in conjunction with the base image. The overlay image is rendered by the rendering module 330 in response to the visual segment, the key color value, and/or the instrumentation data.

The compositing module 340 receives the overlay image from the rendering module 330 and the image data 360 from the camera 320. In one embodiment, the compositing module 340 integrates the image data 360 within the overlay image. In other words, the compositing module 340 blends the image data 360 within the overlay image to create a single, combined overlay image wherein the combined overlay image includes the overlay image from the rendering module 330 combined with the image data 360 which depicts a real event captured by the camera 320.

For the sake of clarity, the embodiment shown in the system 300 is illustrated utilizing the overlay image created by the rendering module 330 and image data representing a single base image captured by the camera 320. In another embodiment, multiple overlay images and image data representing multiple base images may be utilized to create a stream of images representing a video stream. Further, this stream of images both overlay and base may be combined by the compositing module 340.

A televised football game has been utilized as an example within various embodiments of the invention. However, any type of live event is suitable as application for use with the invention. In a televised football game, the static portions of the world model include the football field and surrounding stadium. The dynamic objects include the football players and the ball. If the instrumentation data includes tracking the position of the football players, then the football player positions may be tracked using a technique such as inverse kinematics in one embodiment. If the instrumentation data includes tracking the particular motions of the football players, then the football player motions may be tracked using a technique such as joint position and/or orientation in one embodiment.

Figure 4:
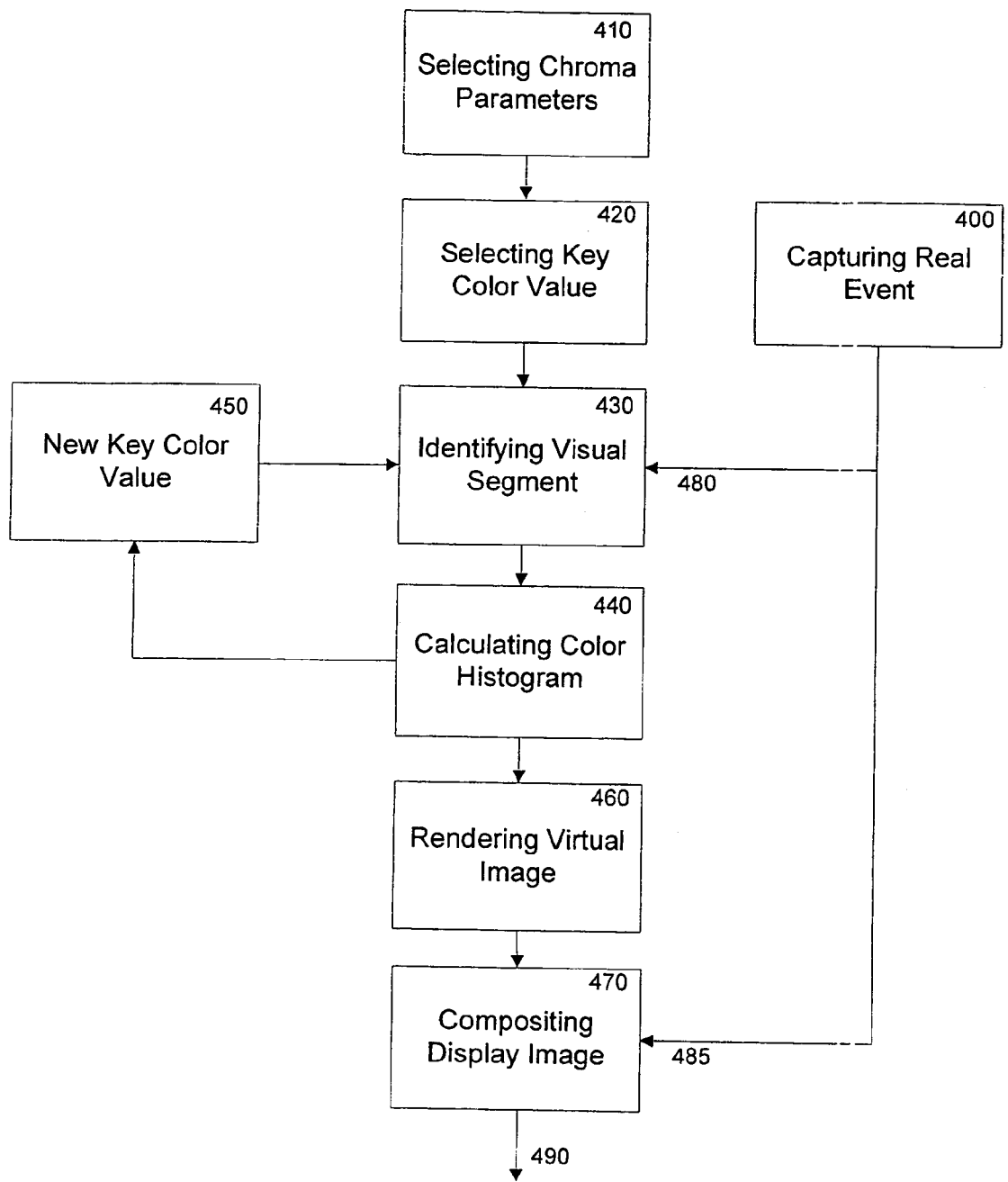
FIG. 4 illustrates an exemplary process flow diagram according to the invention.
Figure 5:
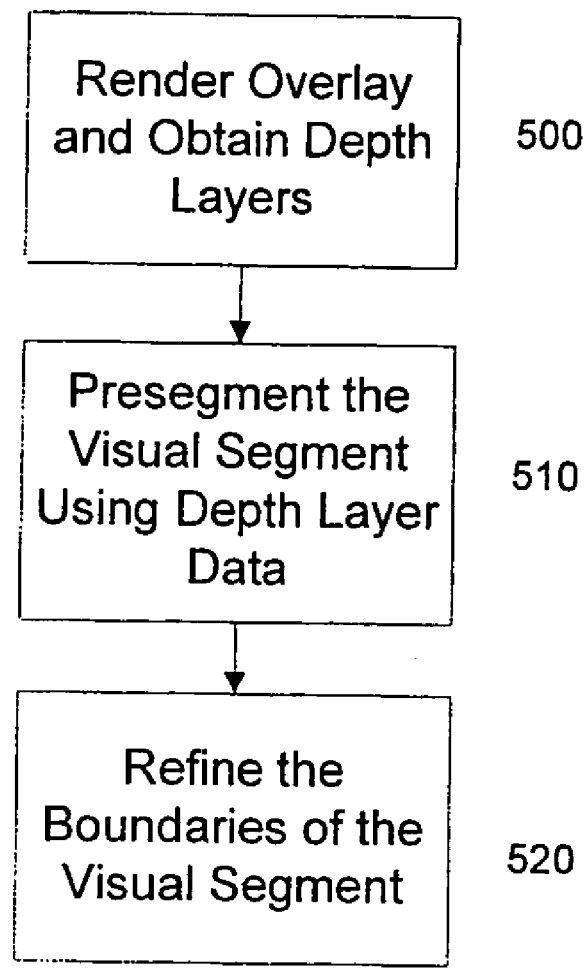
FIG. 5 illustrates an exemplary process flow diagram according to the invention.

The flow diagrams as depicted in FIGS. 4 and 5 are merely one embodiment of the invention. In this embodiment, the flow diagrams illustrate the use of the instrumentation data within the system 300 (FIG. 3).

The blocks within the flow diagram may be performed in a different sequence without departing from the spirit of the invention. Further, blocks may be deleted, added or combined without departing from the spirit of the invention.

In Block 400, a real event is captured by a camera and/or sensor. A series of base images are captured by the camera and a corresponding series of instrumentation data are captured by the camera and/or sensor.

In Block 410, the chroma keying parameters are selected by a user. Various chroma keying parameters may be selected such as a key color value, spill removal, softness, garbage mate, key shrink, glossing, shadows, flare suppression, and the like.

In Block 420, the key color value is selected. In one embodiment, the selection of the color key value may be manually performed by the user. In another embodiment, the selection of the color key value may be automated. The color key value may be defined over a finite range of color values.

For example, a weatherman on television typically appears in front of a monochromatic background. During a televised production, a background scene is overlayed onto the monochromatic background while still showing the weatherman in front of the background scene if the key color value is properly matched and has an appropriate range relative to the monochromatic background. The background scene is often a video stream showing various map regions. However, if the key color value has a range that is too broad, portions of the weatherman are erroneously covered with the background scene. Additionally, if the key color value has a range that is too narrow, there will be holes in the background scene which will display the monochromatic background. Further, if the key color value is centered poorly, then both of these effects will occur.

In Block 430, the visual segment is identified according to the segment identifier module 315 (FIG. 3). Instrumentation data 480 and the key color value are received. The visual segment refers to the portion of the base image that receives a superimposed overlay. The key color value and the instrumentation data 480 aid in identifying and tracking the visual segment. The visual segment may be a dynamic target.

In Block 440, a color histogram is calculated for the visual segment according to the color histogram module 325 (FIG. 2).

In Block 450, a new key color value is calculated from the color histogram. The new key color value updates the key color value according to the visual segment. The visual segment may be dynamic. For example, as the visual segment changes in color due to movement, shadows, varying environment, and the like. The new key color value is transmitted to the Block 430 thereby updating the key color value from the Block 420.

In Block 460, the rendering module 330 generates an overlay image. Multiple overlay images represents a video data stream. The overlay image is configured to overlay the visual segment within the base image. In one embodiment, the overlay image may include a graphics image, a captured image, and the like. The overlay image may take the form of an advertisement, a scoreboard, a logo, and the like.

In Block 470, the compositing module 340 (FIG. 3) integrates and blends the overlay scene data stream and the base video stream in response to the rendering process shown for exemplary purposes within the rendering module 330. The overlay image and the base image 485 are received.

The Blocks 400-470 are performed within the context of the segment identifier module 315, the color histogram module 325, the rendering module 330 and the compositing module 340 for exemplary purposes only. In other embodiments, the Blocks 400-470 may be performed in any generalized processor or any graphics specific processor.

FIG. 5 illustrates a depth layer technique for use within the system 300. In Block 500, the instrumentation data is received by the segment identifier module 315 in one embodiment. The instrumentation data may include both camera instrumentation data and performance instrumentation data. The instrumentation data is utilized to generate a depth map. The depth map illustrates a layer representation of the objects within the base image.

In Block 510, the depth map information may be utilized to pre-segment a portion of the visual segment. For example, the depth map information is utilized to identify an object that is located in front of an area in the visual segment where the overlay image is inserted. The portion of the visual segment that is blocked by the object may be excluded from the visual segment and from the color histogram calculations.

In Block 520, the pre-segment information, the instrumentation data, and the key color value are utilized to identify boundaries of the visual segment.

Figure 6:
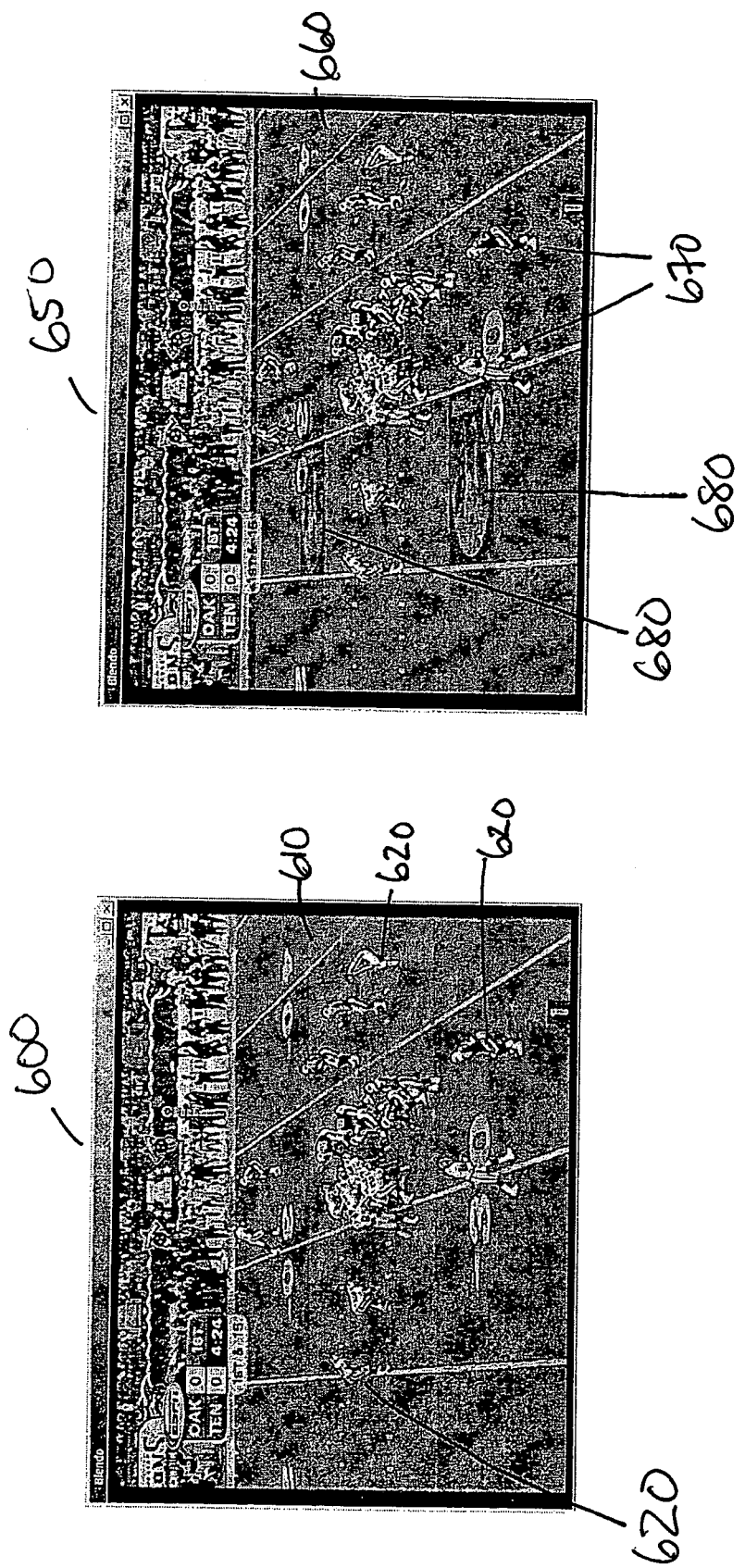
FIGS. 6-7 show an exemplary screen shot illustrating one embodiment according to the invention.
Figure 7:
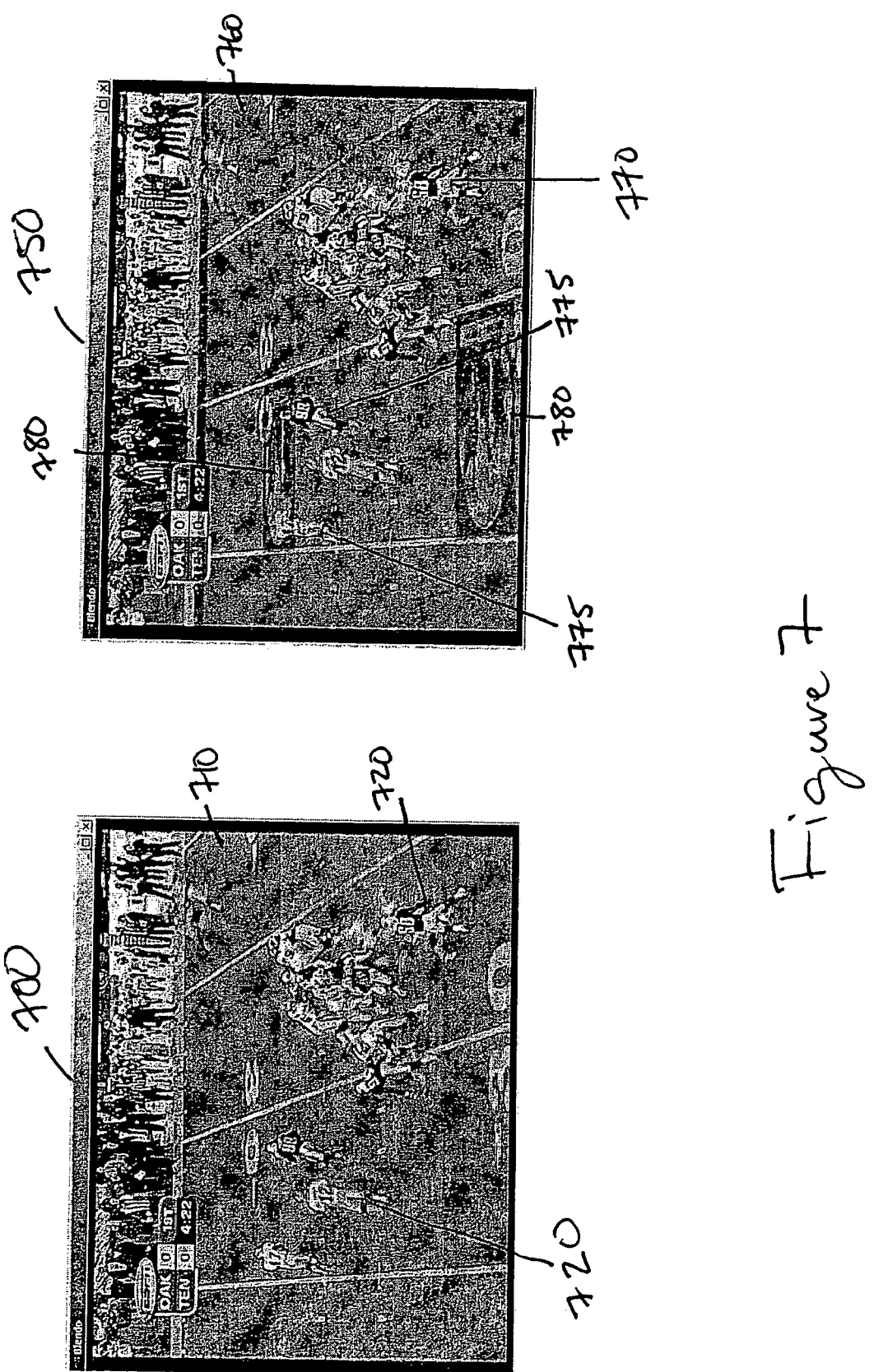

For the sake of clarity, FIGS. 6 and 7 illustrate a particular screen shot for demonstrating one embodiment for the invention. Other embodiments may contain variations of the particular screen shots shown in FIGS. 6 and 7 without departing from the spirit of the invention. In the screen shots, a televised football application is utilized. However, any live event may be utilized in other embodiments.

FIG. 6 illustrates screen shots 600 and 650. The screen shot 600 includes a real scene image that is captured by a camera. The screen shot 600 includes, in part, a football field 610 and a plurality of football players 620.

The screen shot 650 incorporates the base scene of the screen shot 600 and an overlay image. The screen shot 650 includes a football field 660, a plurality of football players 670, and a plurality of graphics 680. The plurality of graphics 680 represent a team logo and are part of the overlay image which is integrated with the base scene image.

In one embodiment, the system 300 (FIG. 3) integrates the overlay image such as the plurality of graphics 680 and the base scene image such as the football field 660 and the plurality of football players 670 via the instrumentation data.

FIG. 7 illustrates screen shots 700 and 750. The screen shot 700 includes a base scene image that is captured by a camera. The screen shot 700 includes, in part, a football field 710 and a plurality of football players 720.

The screen shot 750 incorporates the base scene of the screen shot 700 and an overlay image. The screen shot 750 includes a football field 760, a plurality of football players 770, and a plurality of graphics 780. The plurality of graphics 780 represent a team logo and are part of the overlay image which is integrated with the base scene image. A group of football players 775 are positioned in front of the plurality of graphics 780. Because of the position of the group of football players 775 relative to the plurality of graphics 780, the visual segment excludes the area occupied by the group of football players 775. Accordingly, the plurality of graphics 780 are rendered behind the group of football players 775 to prevent obstructing their view by a user.

In one embodiment, the system 300 (FIG. 3) integrates the overlay image such as the plurality of graphics 780 and the base scene image such as the football field 760, the plurality of football players 770, and the group of football players 775 via the instrumentation data. In another embodiment, the depth layer system as illustrated in FIG. 5 is utilized for ordering objects and excluding the group of football players 775 from the visual segment via the instrumentation data.

The foregoing descriptions of specific embodiments of the invention have been presented for purposes of illustration and description. For example, the invention is described within the context of auto racing and football as merely embodiments of the invention. The invention may be applied to a variety of other theatrical, musical, game show, reality show, and sports productions.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A computerized method:
capturing, by a data acquisition system, a base image of a real event and instrumentation data associated with the real event, wherein the base image comprises a representation of a dynamic object that is moving relative to a multi-chromatic background in the real event, and the instrumentation data comprises global positioning data characterizing the dynamic object location in the real event;
transmitting the captured base image and the instrumentation data;
receiving the transmitted base image and the instrumentation data;
using the received global positioning data to identify a visual segment within the received base image, wherein the visual segment is part of the base image, excludes an entire area of the base image occupied by the dynamic object representation, is smaller than a size of the base image, and includes a part of the multi-chromatic background;
rendering an overlay image within the visual segment, wherein the overlay image is behind the dynamic object representation; and
simultaneously outputting the base image and the overlay image within the visual segment.

2. The method according to claim 1, wherein the instrumentation data is further associated with a camera device and includes information associated with at least one of a camera position, a camera zoom, a camera pan, a camera tilt, and a camera field-of-view.

3. The method according to claim 1, wherein the instrumentation data further comprises performance instrumentation data associated with one or more physical parameters of the real event.

4. The method according to claim 3, wherein the performance instrumentation data is associated with a participant in the real event.

5. The method according to claim 1 further comprising tracking a location of the visual segment within the base image using the instrumentation data.

6. The method according to claim 1, wherein the visual segment is defined by a moving surface.

7. The method according to claim 6 further comprising updating the visual segment by utilizing the updated key color value.

8. The method according to claim 1, further comprising identifying an updated key color value for a key color value from a color distribution of the visual segment.

9. The method of claim 1, wherein the overlay image is one of an advertisement, a scoreboard, and a logo.

10. The method of claim 1, wherein the characterizing data further includes data indicating a force on the object.

11. The computerized method of claim 1, further comprising:
generating a depth map for the base image, the depth map illustrating a layer representation of the dynamic object in the base image; and
pre-segmenting the visual segment to identify the dynamic object in the received base image using depth map.

12. An apparatus comprising:
means for capturing a base image of a real event, the base image comprises a representation of a dynamic object that is moving relative to a multi-chromatic background in the real event;
means for capturing and broadcasting instrumentation data associated with the real event by the data acquisition system, the instrumentation data comprises global positioning data characterizing the dynamic object location in the real event, wherein means for capturing and broadcasting the instrumentation data includes a sensor;
means for identifying a visual segment within the base image by utilizing received global positioning data, wherein the visual segment is part of the base image, excludes an entire area of the base image occupied by the dynamic object representation, is smaller than a size of the base image, and includes a part of the multi-chromatic background;
means for rendering an overlay image within the visual segment, wherein the overlay image is behind the dynamic object representation; and
means for simultaneously outputting the base image and the overlay image within the visual segment.

13. The system according to claim 12 wherein the instrumentation data is further associated with a camera device and includes one of a camera position, a camera zoom, a camera pan, a camera tilt, and a camera field-of-view.

14. The system according to claim 12 wherein the instrumentation data is associated with a participant in the real event.

15. The system of claim 12, wherein the overlay image is one of an advertisement, a scoreboard, and a logo.

16. The system of claim 12, wherein the characterizing data further includes data indicating a force on the object.

17. A computerized method comprising:

receiving, by a data acquisition system, a base image of a real event and instrumentation data associated with the real event, wherein the base image comprises a representation of a dynamic object that is moving relative to a multi-chromatic background in the real event, the instrumentation data comprises global positioning data characterizing the dynamic object location in the real event, and the base image and the instrumentation data are concurrently captured;

identifying a visual segment within the received base image using the received global positioning data, wherein the visual segment is part of the base image, excludes an entire area of the base image occupied by the dynamic object representation, is smaller than a size of the base image, and includes a part of the multi-chromatic background;

rendering an overlay image within the visual segment, wherein the overlay image is behind the dynamic object representation; and simultaneously outputting the base image and the overlay image within the visual segment.

* * * * *